United States Patent
Teserra

(10) Patent No.: US 11,538,468 B2
(45) Date of Patent: Dec. 27, 2022

(54) USING SEMANTIC FRAMES FOR INTENT CLASSIFICATION

(71) Applicant: Oracle International Corporation, Redwood Shores, CA (US)

(72) Inventor: Saba Amsalu Teserra, Sunnyvale, CA (US)

(73) Assignee: Oracle International Corporation, Redwood Shores, CA (US)

(*) Notice: Subject to any disclaimer, the term of this patent is extended or adjusted under 35 U.S.C. 154(b) by 141 days.

(21) Appl. No.: 17/016,203

(22) Filed: Sep. 9, 2020

(65) Prior Publication Data

US 2021/0082410 A1 Mar. 18, 2021

Related U.S. Application Data

(60) Provisional application No. 62/899,692, filed on Sep. 12, 2019.

(51) Int. Cl.
  *G10L 15/05* (2013.01)
  *G10L 15/18* (2013.01)
  *G10L 15/26* (2006.01)
  *H04L 51/02* (2022.01)

(52) U.S. Cl.
  CPC .......... *G10L 15/1815* (2013.01); *G10L 15/05* (2013.01); *G10L 15/26* (2013.01); *H04L 51/02* (2013.01)

(58) Field of Classification Search
  CPC ......... G10L 15/22; G10L 15/16; G10L 15/05; G10L 15/1815; G10L 15/1822; G10L 15/24; G10L 15/19; G10L 15/183; G10L 17/22; G10L 2015/223; G06F 40/30; G06F 40/237; G06F 40/40; G06F 40/35; G06F 40/56
  See application file for complete search history.

(56) References Cited

U.S. PATENT DOCUMENTS

| | | | |
|---|---|---|---|
| 8,073,681 B2* | 12/2011 | Baldwin | G10L 15/1822 704/275 |
| 9,105,266 B2* | 8/2015 | Baldwin | G06Q 30/0273 |
| 9,262,406 B1 | 2/2016 | Das et al. | |

(Continued)

OTHER PUBLICATIONS

Das et al., "Frame-Semantic Parsing", Computational Linguistics, vol. 1, No. 1, Mar. 2014, 82 pages.

(Continued)

*Primary Examiner* — Vijay B Chawan
(74) *Attorney, Agent, or Firm* — Kilpatrick Townsend & Stockton LLP

(57) ABSTRACT

The present disclosure relates to chatbot systems, and more particularly, to techniques for identifying an intent for an utterance based on semantic framing. For an input utterance, a semantic frame is generated. The semantic frame includes semantically relevant grammatical relations and corresponding words identified in the utterance. The semantically relevant grammatical relations define context and relationships of words in the utterance. The semantic frame is used to identify an intent for the utterance, based on an intent model. The intent model maps features to corresponding words for a given intent. The semantic frame is compared to a plurality of intent models, and a best-matching intent model is used to identify the intent for the utterance.

11 Claims, 7 Drawing Sheets

(56) References Cited

U.S. PATENT DOCUMENTS

| 9,502,025 | B2* | 11/2016 | Kennewick | G06Q 30/0601 |
| 9,961,200 | B1* | 5/2018 | Kothuvatiparambil | |
| | | | | G10L 15/1822 |
| 10,261,752 | B2* | 4/2019 | Sung | G10L 15/1815 |
| 10,431,214 | B2* | 10/2019 | Guo | G06F 40/237 |
| 10,573,298 | B2* | 2/2020 | Anders | G06F 40/56 |
| 2010/0217604 | A1* | 8/2010 | Baldwin | G06Q 30/0261 |
| | | | | 704/E21.001 |
| 2011/0112921 | A1* | 5/2011 | Kennewick | G06Q 30/0601 |
| | | | | 705/26.1 |
| 2013/0054228 | A1* | 2/2013 | Baldwin | G10L 15/24 |
| | | | | 704/E21.001 |
| 2016/0148610 | A1* | 5/2016 | Kennewick, Jr. | G10L 15/18 |
| | | | | 704/240 |
| 2016/0148612 | A1* | 5/2016 | Guo | G06F 40/237 |
| | | | | 704/257 |
| 2018/0232817 | A1* | 8/2018 | Isaacson | G06F 3/048 |
| 2019/0007381 | A1* | 1/2019 | Isaacson | G06Q 20/12 |
| 2019/0230070 | A1* | 7/2019 | Isaacson | H04W 12/084 |
| 2019/0306137 | A1* | 10/2019 | Isaacson | G06Q 20/20 |

OTHER PUBLICATIONS

Fillmore et al., "A Frames Approach to Semantic Analysis", Available online at: https://pdfs.semanticscholar.org/a90f/974720306b9dffccf4d522c9afe14520725a.pdf?_ga=2.163919163.545188423.1599722631-781542616.1598945889; Chapter 13, Jun. 30, 2009; pp. 313-339.

Fillmore et al., "Frame Semantics for Text Understanding", Available online at: http://www.sfs.uni-tuebingen.de/~keberle/Lit/framenet.pdf, Jan. 2001, 6 pages.

Hermann et al., "Semantic Frame Identification with Distributed Word Representations", Proceedings of the 52nd Annual Meeting of the Association for Computational Linguistics, vol. 1, Jun. 2014, pp. 1448-1458.

Jurafsky et al., "Semantic Role Labeling", Speech and Language Processing, vol. 3, Oct. 16, 2019, pp. 373-393.

Lukasik et al., "Does Label Smoothing Mitigate Label Noise?", Machine Learning, Mar. 6, 2020, 18 pages.

Manning et al., "The Stanford CoreNLP Natural Language Processing Toolkit", Proceedings of 52nd Annual Meeting of the Association for Computational Linguistics System Demonstrations, Association for Computational Linguistics, Available online at: https://www.aclweb.org/anthology/P14-5010.pdf, Jun. 2014, pp. 55-60.

Marneffe et al., "Stanford Typed Dependencies Manual", Revised for the Stanford Parser v. 3.7.0 in Sep. 2016, Sep. 2008, 28 pages.

Palmer et al., "The Proposition Bank: An Annotated Corpus of Semantic Roles", Computational Linguistics, vol. 31, No. 1, Mar. 2005, 36 pages.

Real et al., "The Probabilistic Basis of Jaccard's Index of Similarity", Systematic Biology, vol. 45, No. 3, Sep. 1996, pp. 380-385.

Wertheimer, "Bayesian Analysis for Probability-Matching", Available online at: http://cocolab.stanford.edu/class/psych204/spring2015/Wertheimer_Report.pdf, 2015, 5 pages.

* cited by examiner

USING SEMANTIC FRAMES FOR INTENT CLASSIFICATION

COPYRIGHT

A portion of the disclosure of this patent application contains material which is subject to copyright protection. The copyright owner has no objection to the facsimile reproduction by anyone of the patent application or the patent disclosure, as it appears in the Patent and Trademark Office patent file or records, but otherwise reserves all copyright rights whatsoever.

CROSS-REFERENCE TO RELATED APPLICATIONS

The present application claims the benefit and priority under 35 U.S.C. 119(e) of U.S. Application No. 62/899,692, filed on Sep. 12, 2019, entitled "USING SEMANTIC FRAMES FOR INTENT CLASSIFICATION," the content of which is herein incorporated by reference in its entirety for all purposes.

TECHNICAL FIELD

The present disclosure relates to chatbot systems, and more particularly, to techniques for identifying an intent for an utterance based on semantic framing.

BACKGROUND

Chatbots or bots provide an interface for conversations with human users. Chatbots can be configured to perform various tasks in response to user input provided during a conversation. The user input can be supplied in various forms including, for example, audio input and text input. Natural language understanding (NLU), speech-to-text, and other linguistic processing techniques may be employed as part of the processing performed by a chatbot.

An intelligent bot, generally powered by artificial intelligence (AI), can improve the conversational experience, allowing a more natural conversation between the bot and the end user. Instead of the end user learning a fixed set of keywords or commands that the bot knows how to respond to, an intelligent bot may be able to understand the end user's intention based upon user utterances in natural language and respond accordingly. In many cases, determining the end user's intents in order to respond properly is a challenging task in part due to the subtleties and ambiguity of natural languages.

BRIEF SUMMARY

The present disclosure relates to chatbot systems, and more particularly, to techniques for identifying an intent for an utterance based on semantic framing. Various embodiments are described herein, including methods, systems, non-transitory computer-readable storage media storing programs, code, or instructions executable by one or more processors, and the like.

In some embodiments, a computer system receives an utterance. The computer system generates a semantic frame for the utterance, wherein generating the semantic frame comprises identifying one or more semantically relevant grammatical relations for inclusion in the semantic frame. The computer system determines a plurality of scores for a respective plurality of intents based on matching of a particular relation in the semantic frame to a plurality of features associated with the plurality of intents and identifies, based on the scores, a particular intent, of the plurality of intents, as corresponding to the utterance.

In some aspects, determining each score, of the plurality of scores, comprises determining a level of overlap between an intent model for an intent, of the plurality of intents, and the semantic frame. In some aspects, the level of overlap is determined by computing an overlap coefficient. In some aspects, the overlap coefficient is a Szymkiewicz-Simpson coefficient.

In some aspects, the intent model is a multi-key map of features to words. In some aspects, the score is determined based on weights assigned to each of the respective features in the intent model.

In some aspects, the computing system further generates a response based on the identified intent and transmits the response as output. In some aspects, the relations correspond to parts of speech defining relationships between words.

Embodiments further include systems and computer-readable media for performing the above methods.

The foregoing, together with other features and embodiments will become more apparent upon referring to the following specification, claims, and accompanying drawings.

DETAILED DESCRIPTION

Figure 1:
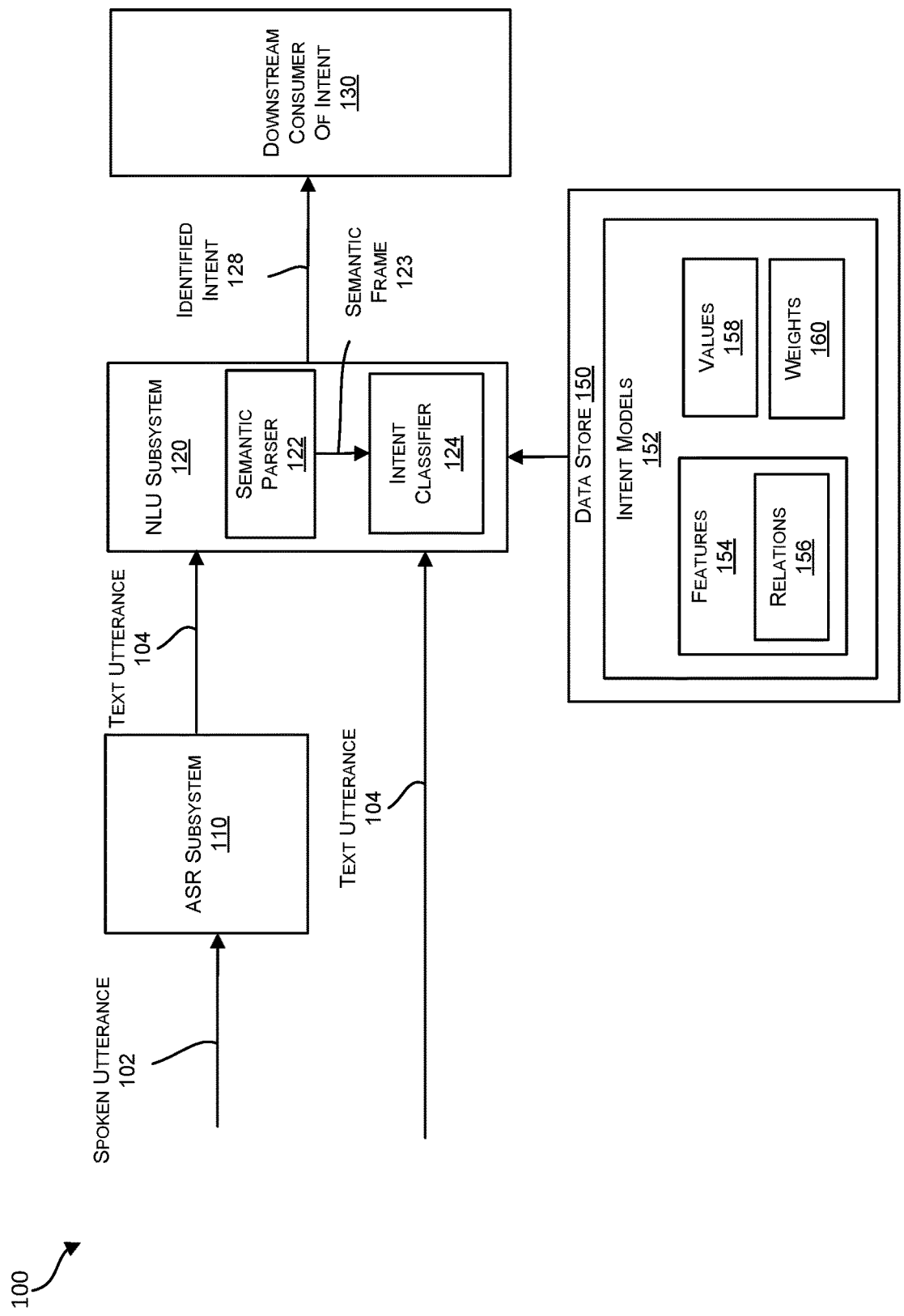
FIG. 1 depicts a simplified diagram of a chatbot system according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

In cognitive linguistics, grammatical constructions are generally carriers of meaning. Lexical items used in a construction, especially the meaning of a verb and the argument structure of the verb, may be fitted into a construction framework in order to facilitate machine understanding of the meaning of an utterance. For intent identification, the fitting may involve mapping the semantics of the utterance (which is unstructured) to a structured frame that can be machine processed. The mapping enables: (1) high precision intent prediction, (2) separation of content from grammatical constructs, and (3) use of the constructs to define relationships between content.

In certain embodiments, given an utterance, the parts of the utterance that have semantic significance, such as direct object, prepositional object, and modifiers are extracted to create a semantic frame. The format of the semantic frame is indicative of the meaning of the utterance. Examples of utterances that have the same semantic meaning/significance are:

utt1: I would like to order pizza
utt2: order pizza
utt3: Can I order pizza

In each of the three utterances above, the meaning of the utterance is conveyed through the phrase "order pizza", while the rest of the utterance consists of words that are not relevant to the meaning. Thus, for the three utterances, the grammatical relation directObject (order, pizza) could be derived. Such relations could be obtained for each potential intent, from training data, and then weighted. Weighting is particularly useful when the same relations exist for different intents. For example, the utterances "buy blue shirt" and "how much is the blue shirt?" correspond to different intents, but both include the same adjectival clause "blue shirt." Accordingly, weighting the direct object higher than the adjectival clause can help ensure determination of the appropriate intent. This training can be done over all semantically relevant features.

A semantic frame may be generated based on analysis of a dependency tree. The semantic frame can then be used to distinguish between phrases that contain similar words, but different meaning. For example, a semantic frame can be used to distinguish "I would not like to order pizza" from "I would like to order pizza". The generated semantic frame is compared to a plurality of intent models to identify a corresponding intent. The intent models can be implemented algorithmically using a set of rules. Alternatively, the intent models can be implemented using machine learning, for example, through a perceptron algorithm or a logistic regression algorithm.

In some embodiments, a computer system receives an utterance. The computer system may receive a typed or spoken utterance from a user. The computer system generates a semantic frame for the utterance. A semantic frame is a structured construction of how different words in an utterance function and relate to one another. For a given word, a frame of semantic knowledge highlights a the specific concept that the word evokes. The semantic frame is generated by identifying one or more semantically relevant grammatical relations for inclusion in the semantic frame. Relations, or grammatical relations, are constructs that define the semantic role of one or more words in an utterance. A relation indicates the function of a word in a sentence or utterance. For example, a relation can indicate that a particular word is used as a direct object, adjective, adverb, and so forth. A relation can define relationships between different words or groups of words. For example, the relation Adjective clause (blue, shirt) defines a relationship between the words "blue" and "shirt." Alternatively, or additionally, a relation can describe the contextual meaning of a word. For example, the semantic frame for the word "fear" may include a definition of the word fear, types of words associated with fear—fear is commonly associated with an experiencer who experiences the fear, a stimulus that causes the fear, and so forth. The chatbot system can generate the semantic frame by linking one or more relevant words in an utterance to identified relations.

In some aspects, to determine an intent using the semantic frame, the computer system identifies a plurality of stored intent models. Each intent model maps an intent to a plurality of features. The features include relations that were identified by generating semantic frames for training utterances. The computing system compares the features in each intent model to the relations in a semantic frame for a received utterance to generate a score for each of the intents. Based on the scores, the computer system selects an intent. For example, the computer system may select an intent with a score exceeding a threshold value, or select a highest score of a plurality of identified scores, and select that intent for the utterance.

By using semantic frames to identify an intent, the intent can be identified with improved accuracy, compared to traditional intent classification approaches. Traditional intent classification approaches use sentence embeddings that disregard deeper meanings such as the semantic relations among words. Due to subtleties in human speech, disregarding this information can lead to inaccurate intent predictions. Accordingly, the semantic frames can be used to retain information about the semantic relations for improving the accuracy of the intent determination task.

The intent determination techniques described herein are further advantageous due to the relatively low amount of training required. Traditional intent classifiers must be retrained in a time-consuming process when intents are added or removed. Because the intent models used herein are compared to semantic frames that hold a deeper level of meaning than a traditional sentence embedding, the intent matching can be performed on new utterances or intents with little or no retraining required.

Example Chatbot System

FIG. 1 is a simplified block diagram of a chatbot system 100 (e.g., a specialized computer system) according to certain embodiments. For purposes of this disclosure, a "chatbot" is an entity that helps users of the chatbot accomplish various tasks through natural language conversations. A chatbot can be implemented using software only (e.g., the chatbot is a digital entity implemented using programs, code, or instructions executable by one or more processors), using hardware, or using a combination of hardware and software. A chatbot can be embodied or implemented in various physical systems or devices, such as in a computer, a mobile phone, a watch, an appliance, a vehicle, and the like. A chatbot is also sometimes referred to as a digital assistant. Accordingly, for purposes of this disclosure, the terms chatbot and digital assistant are interchangeable.

In certain embodiments, the processing performed by the chatbot system 100 is implemented by a pipeline of components or subsystems, including an automatic speech recognition (ASR) subsystem 110 and a natural language understanding (NLU) subsystem 120, which may include a semantic parser 122 and an intent classifier 124. The chatbot system 100 may further include, or be communicatively coupled to, a data store 150 and a downstream consumer of intent 130. In certain implementations, one or more of the subsystems may be combined into a single subsystem. Additionally or alternatively, in some implementations, the functions described herein as performed by a particular subsystem may be implemented by multiple subsystems.

The chatbot system 100 can be used to perform various tasks via natural language-based conversations between the chatbot system 100 and its users. As part of a conversation, a user may provide one or more user inputs to the chatbot system 100 and get responses back from the chatbot system 100. A conversation can include one or more of inputs and responses. Via these conversations, a user can request one or more tasks to be performed by the digital assistant and, in response, the digital assistant is configured to perform the user-requested tasks and respond with appropriate responses to the user.

User inputs are generally in a natural language form and are referred to as utterances. An utterance, which may be a text utterance 104 or a spoken utterance 102, can be a fragment, a sentence, multiple sentences, one or more words, one or more questions, combinations of the aforementioned types, and the like. A text utterance 104 is in text form, such as when a user types in a sentence, a question, a text fragment, or even a single word and provides the text as input to the chatbot system 100. In some embodiments, user input can be received as a spoken utterance 102 in audio input or speech form, such as when a user says or speaks something that is provided as input to the chatbot system 100. The spoken utterances 102 are typically in a language spoken by the user (e.g., English, Mandarin, French, Spanish, etc.).

In some aspects, the chatbot system 100 includes an ASR subsystem 110 that converts spoken utterances 102 to text utterances 104. The ASR subsystem 110 is configured to receive and monitor spoken voice input and to convert the voice input to text. As part of its processing, the ASR subsystem 110 performs speech-to-text conversion. Various speech-to-text processing techniques may be used to convert a speech or audio input to a text utterance. The spoken speech or voice input may be in a natural language form, and the ASR subsystem 110 is configured to generate the corresponding natural language text in the language of the speech input. The voice input received by the ASR subsystem 110 may include one or more words, phrases, clauses, sentences, questions, etc. The ASR subsystem 110 is configured to generate a text utterance for each spoken clause and feed the text utterances to the NLU subsystem 120 for further processing.

The NLU subsystem 120 is configured to apply natural language understanding (NLU) techniques to a received text utterance 104 to understand the meaning of the user input. As part of the NLU processing for an utterance, the NLU subsystem 120 is configured to perform processing to understand the meaning of the utterance, which involves identifying one or more intents and one or more entities corresponding to the utterance. The NLU subsystem may retrieve information from a data store 150 for use in identifying the intents and named entities.

The NLU subsystem 120 may include a semantic parser 122 for converting a natural language utterance to a meaning representation. The semantic parsing performed by the semantic parser 122 can include various processing such as tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like. In certain embodiments, the semantic parsing or portions thereof is performed by the chatbot system 100 itself. In some other embodiments, the chatbot system may use other resources to perform portions of the semantic parsing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford NLP Group are used for analyzing the sentence structure and syntax. These are provided as part of the Stanford CoreNLP toolkit, as described in Manning et al., *The Stanford CoreNLP Natural Language Processing Toolkit* (2014).

In some aspects, the semantic parser 122 generates a semantic frame 123 for a given utterance. A semantic frame 123 is a structured construction of how different words in an utterance function and relate to one another. A semantic frame 123 may include one or more relations tied to one or more words in the utterance. The semantic frame 123 may include a set of relations and corresponding values. For example, in the utterance "I need this done quickly," "quickly" corresponds to the relation adverbialModifier, and "done quickly" corresponds to the relation adverbialClause advcl (done, quickly).

The following is a non-exhaustive list of semantically relevant relations that may be identified by the chatbot system as part of building a semantic frame for an utterance:

directObject: e.g., "send/money" in "I would like to send money from my Savings". The whole relation send|money is captured.

objectSimple: e.g., "money" in "I would like to send money from my Savings". Only the object money is captured.

subject: the subject in interrogatives are relevant: e.g., "balance" in "what is my balance". The whole expression balance/what is captured. But since the question word (what) could be any other Wh-word they are all transformed into balance/WH. It should be noted that there are other subject-related transformations also. For example, all proper nouns can be replaced by the label NNP since it does not matter whether the person you want to send money to is Robert or John—both are proper nouns representing a person. Thus, these transformations help us generalize. Additionally, pronouns and prepositions associated with those pronouns can be transformed to the same keys in a multi-key model as described herein.

adverbialModifier: e.g., the word "fast" in the sentence, "She ran fast".

Case_: is the prepositional object: e.g., "Savings" in "I would like to send money from my Savings".

adjectiveModifierToRoot: This is relevant when the input utterance is a fragment (e.g., no verb) and the root is a noun. For example, "large" in "large pizza". The whole relation large|pizza is captured since there can be a large anything.

nounModifier: noun modifiers are found in expressions of the type, "The chair in the room". In this example, room modifies chair. Again, the whole relation is captured since "the water in the room" is totally different in meaning compared to "the chair in the room".

root: the root is generally the main verb (not the auxiliary) of a sentence.

passiveSubject: e.g., "How much did I get paid" (as opposed to "how much did I pay") has the phrase "I get paid", in which phrase "I" is the passive subject.

passiveAuxiliary: e.g., in "How much did I get paid", "get" is auxiliary to "paid".

interjection (UH): check for the presence of interjections (hi, howdy, etc.).

negation: e.g., "I do not want my last order anymore".

greeting: when the parser fails to identify interjections, a vocabulary of greetings can be consulted. Thus, a list of known greetings can be used as a lookup in addition to the detection of interjections in the utterance.

temporalModifier: e.g., temporal modifiers in the phrase "what year is it". A temporal modifier of a verb phrase (VP) or an adjective phrase (ADJP) is any constituent that serves to modify the meaning of the VP or the ADJP by specifying a time. A temporal modifier of a clause is an temporal modifier of the VP which is the predicate of that clause.

compound: e.g., "credit card" is a compound word consisting of "credit" and "card".

openClausalComplement: the Open Clausal Complement of a verb or an adjective is a predicative or clausal complement without its own subject.

subject: e.g., (talk/support) in "Would like to talk to support".

adverbialClause: e.g., in "update task ABC as finished", advcl (update, finished) is the adverbial clause.

adjectivalClause: e.g., in "show tasks still pending", acl (tasks, pending) is the adjectival clause.

adjectiveModifier: e.g., in "show my new tasks", amod (tasks, new) is the adjective modifier.

multiWordNames: e.g., names of companies, places, movie titles. A multiword name often has more than two words. Prepositions and articles in-between such words are allowed.

In some embodiments, one or more relations in the semantic frame further include contextual information denoting a broader meaning of a given word. For example, the word "weather" is linked to various weather-related words such as blizzard, climate, fair, and so forth, as well as frame elements place and time, as weather is commonly described in terms of a place and time. The FrameNet Corpus (https://framenet.icsi.berkeley.edu/fndrupal/) is an example of a corpus of semantic frames and documents annotated with semantic frame information. Another semantic frame project is Proposition Bank ("PropBank"), which maintains its own corpus of semantic frames. (See, e.g., Palmer et al., "The Proposition Bank: An Annotated Corpus of Semantic Roles," Association for Computational Linguistics, 2004). The generated semantic frame 123 may include such contextual information and/or a link to an entry in a semantic frame corpus.

The chatbot system 100 can identify relations corresponding to relevant words in an utterance to generate the semantic frame 123. Examples of semantic frames 123 are illustrated below with respect to FIGS. 2A and 2B. The semantic parser 122 may output the generated semantic frame 123 to the intent classifier 124 for further processing.

The intent classifier 124 can be trained, using machine-learning and/or rules-based training techniques, to determine a likelihood that an utterance is representative of a task that the chatbot system 100 is configured to perform. The intent classifier 124 determines an intent for an utterance using a semantic frame 123. The intent classifier may compare the generated semantic frame 123 to intent models 152 stored to the data store 150. The intent classifier 124 determines an intent for an utterance by determining a level of overlap between each of a plurality of intent models and the semantic frame 123.

In certain embodiments, based on comparing each intent model 152 to the semantic frame 123, the intent classifier 124 determines a confidence score for each system level intent (e.g., Help, Exit, Order Pizza, Get Directions, etc.) that has been configured. If a particular confidence score meets one or more conditions, then the identified intent 128 may be selected and output to another component or system for further processing. For example, the chatbot system may select a particular intent based on the highest-scored intent, of a set of intents, and/or based on the intent score exceeding a threshold value. In some embodiments, in addition to meeting a threshold confidence score value, the confidence score must exceed the next highest confidence score by a certain win margin. Imposing such a condition can enable selecting an appropriate intent when the confidence scores of multiple intents each exceed the threshold confidence score value. Thus, an output of the intent classifier 124 includes an identification of an identified intent 128.

In some embodiments, the data store 150 is a storage unit and/or device (e.g., a file system, database, collection of tables, or other storage mechanism) for storing data for determining intents based on semantic frames. The data store 150 may include multiple different storage units and/or devices. The data store 150 may be local to the chatbot system 100 (e.g., local storage) and/or connected to the chatbot system 100 over a network (e.g., cloud storage).

The data stored by the data store 150 includes intent models 152. The intent models 152 are models configured for use in identifying an intent 128 that is a best match to an input utterance. The intent models 152 can include features 154, including relations 156, values 158, and weights 160. In certain embodiments, each intent model 152 is implemented using a multi-key map comprising a set of keys for each intent and, for each key, one or more corresponding values, where each key is a feature 154 and each value 158 is a word or group of words (e.g., as identified from a training utterance). The features 154 include relations 156 that establish the context of one or more words in an utterance. In some aspects, the intent models 152 may include additional features 154 such as words in an utterance that are not deemed grammatically relevant (e.g., "the" or "a"), the positions of words (e.g., at the beginning or end of a sentence), and so forth. The intent models 152 further include weights 160 for each feature 154. The weights 160 correspond to some linguistic categories having higher impact on the intent than others, and may be determined experimentally and/or through machine learning.

For example, the intent models 152 may be of the form:

```
Intent1:
    feature1:
        value11 : stat111
        value 12 : stat112
        ...
    feature2:
        value21 : stat121
        value 22 : stat122
        ...
Intent2:
    feature1: . . .
```

The intents (Intent1, Intent2, and so forth) are different system intents, such as Order Pizza, Find Weather, Stop, and so forth. Each intent is mapped to one or more features 154. For each feature 154, the intent model 152 includes a corresponding value 158. For example, an intent model 152 for the intent "Order Pizza" would include the key-value pair ObjectSimple (Pizza) including the feature 154 ObjectSimple and the value 158 Pizza. Each feature 154 may further be stored in association with one or more weights 160 (e.g., stat111, stat112, etc.). Certain features 154 may contribute more heavily to the intent determination process, based on the weights 160. For example, features 154 that have been experimentally determined to be more highly correlated with a correct intent selection can be given a higher weight 160 than other features 154 that have a comparatively low impact on the intent.

As indicated above, the intent determination performed by the chatbot system 100 may involve the chatbot system 100 computing scores for the system intents. Thus, the intent classifier 124 may process a text utterance 104 by computing a separate score (e.g., a value between 0% and 100% or 1 to 10) for each system intent associated with the chatbot system 100, or a subset of available intents.

To determine whether to select a particular intent for a text utterance 104, the intent classifier 124 may be configured to compare the scores for a plurality of intents (e.g., to find the highest-scored intent). If the score for a particular intent is determined to be higher than one or more scores for one or more other intents, then the particular intent is identified for the text utterance 104 and the particular intent is selected as the identified intent 128 for output. Alternatively, or additionally, the intent classifier 124 may apply one or more thresholds to each intent. Such thresholds can also be stored to the data store 150. If the confidence score for a system intent satisfies the one or more thresholds, then the system intent is identified for the text utterance 104 and the intent is selected as the identified intent 128 for output.

The NLU subsystem 120 may provide the identified intent 128 to a downstream consumer of intent 130 for further processing. The NLU subsystem 120 may further output a meaning representation for the utterance, which may include additional attributes such as named entities, sentiments, and other indicators of the meaning of the utterance.

The downstream consumer of intent 130 may be another component of the chatbot system 100, an external module, or a user. The downstream consumer of intent 130 may perform one or more actions or operations based on a received intent 130. In some cases, the NLU subsystem 120 may provide additional information to the downstream consumer of intent 130, such as a meaning representation and/or an exact copy of the text utterance 104. Alternatively, the output of the NLU subsystem 120 could include a modified form of the text utterance 104. For example, the output may correspond to the text utterance 104 after removing one or more words such as "I," "would like," "please," or other words that are unnecessary as input for generating a response to the utterance (e.g., words that do not represent system-defined semantic features, named entities, or variables).

In some aspects, the downstream consumer of intent 130 may perform functions based on the identified intent 128 such as preparing a response, performing one or more actions, and maintaining state information. The response to the utterance (e.g., a spoken utterance 102 or text utterance 104) can be provided by a particular component within the chatbot system 100. For example, the response could be an action performed using a built-in or custom component. In certain embodiments, responses are handled by a dialog engine. The dialog engine acts as a conversation manager and its responsibilities could include executing the dialog flow that produces the response to the utterance. Thus, the dialog engine may be configured to initiate state transitions and make calls to components associated with different states.

As an example, a user input may request a pizza to be ordered by providing an utterance (e.g., a spoken utterance 102 or text utterance 104) such as "I want to order a pizza." Upon receiving such an utterance, the chatbot system 100 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by the chatbot system 100 may also be in natural language form and typically in the same language as the input utterance. As part of generating these responses, the chatbot system 100 may perform natural language generation (NLG). For the user ordering a pizza, via the conversation between the user and the chatbot system 100, the chatbot system 100 may guide the user to provide all the requisite information for the pizza order, and then at the end of the conversation cause the pizza to be ordered. The chatbot system 100 may end the conversation by outputting information to the user indicating that the pizza has been ordered.

At a conceptual level, the chatbot system 100 performs various processing in response to an utterance received from a user. In some embodiments, this processing involves a series or pipeline of processing steps including, for example, understanding the meaning of the input utterance (using NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using natural language generation (NLG) techniques. Thus, the natural language processing (NLP) performed by a digital assistant can include a combination of NLU and NLG processing.

While the various examples provided in this disclosure show utterances in the English language, this is meant only as an example. In certain embodiments, the chatbot system 100 is also capable of handling utterances in languages other than English. The chatbot system 100 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A chatbot system, such as the chatbot system 100 depicted in FIG. 1, can be made available or accessible to its users through a variety of different channels, such as but not limited to, via certain applications, via social media platforms, via various messaging services and applications (e.g., an instant messaging application), and other applications or channels. A single chatbot system can have several channels configured for it so that it can be run on and be accessed by different services simultaneously.

In certain embodiments, the chatbot system may be architected using a master bot and sub-bots (referred to as skill bots) paradigm, where a master bot interfaces and communicates with one or more child bots (referred to as skill bots). In such an embodiment, the user interfaces with a single bot, the master bot, which in turn can interface with multiple skill bots as needed. The master bot provides a single centralized interface to the user and is able to converse with several skill bots configured to perform specific processing. For example, for an enterprise, the master bot may interface with skill bots with specific functionalities (e.g., a CRM bot for performing functions related to customer relationship management (CRM), an ERP bot for performing functions related to enterprise resource planning (ERP), an HCM bot for performing functions related to human capital management (HCM), etc.). This way the end user or consumer only needs to know about a single master bot. The master bot provides the capability for a user to interact with multiple bot from a single bot.

In a master bot/skill bots infrastructure, the master bot is configured to be aware of the list of functional/skill bots. Metadata, which is accessible to the master bot, may be provided for each skill bot identifying the skill bot's capabilities. Upon receiving a user request in the form of an utterance, the master bot is configured to identify/predict which specific skill bot, from the multiple available skill bots, would best serve the request. The master bot then routes the utterance to that specific skill bot for further handling. Control thus flows from the master bot to the skill bots. All user requests and messages flow through the master bot. The master bot can support multiple input and output channels.

In certain embodiments, upon receiving a user utterance, the master bot performs intent analysis on the utterance to identify one or more intents for the utterance. The master bot may then select, for each identified intent, a specific skill bot for further processing of the utterance from among one or multiple skill bots available to the master bot. The utterance may then be routed or forwarded by the master bot to the identified skill bot.

Example Semantic Frames

Figure 2A:
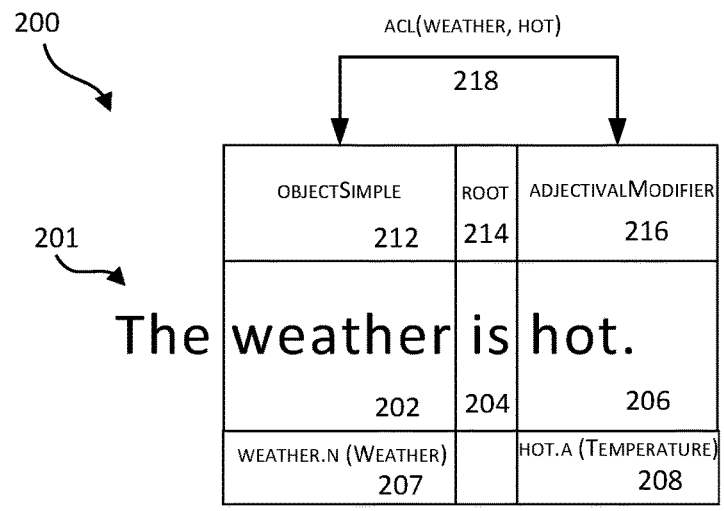
FIGS. 2A-2B depict simplified semantic frames according to some embodiments.
Figure 2B:
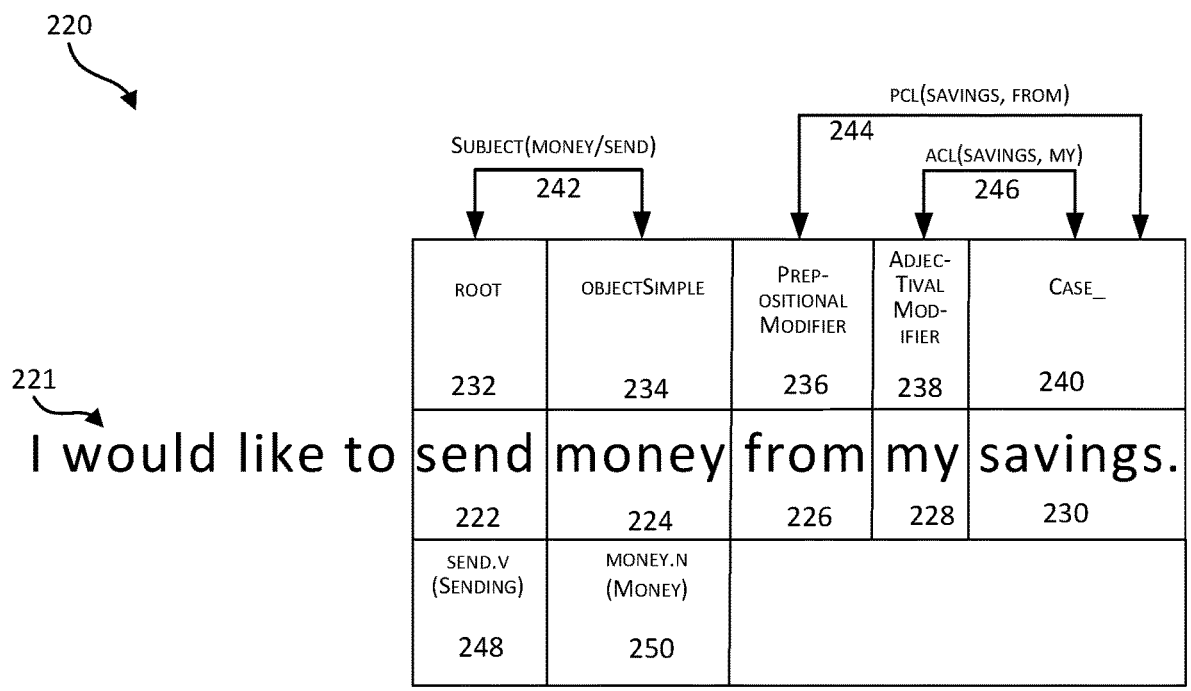

FIGS. 2A-2B depict simplified semantic frames according to some aspects. The semantic frames depicted in FIGS. 2A and 2B are simplified examples, and semantic frames as used herein may include additional elements that are not pictured, include fewer elements, or be rearranged.

FIG. 2A illustrates a semantic frame 200 according to some aspects. The semantic frame 200 is for an utterance 201 "The weather is hot." The semantic frame 200 includes relations 207, 208, 212, 214, 216, and 218, and corresponding word values 202, 204, and 206. As described above, the relations 207-218 are constructs establishing relationship and meaning for a particular word. The relations can correspond to a part of speech or semantic role of one or more of the words. The relation ObjectSimple 212 corresponds to the value weather 202, and indicates the role of the word weather 202 in the utterance 201. The relation Root 214 corresponds to the value is 204, and indicates the role of the word is 204 in the utterance 201. The relation AdjectivalModifier 216 corresponds to the value hot 206, and indicate the role of the word hot 206 in the utterance 201. The relation AdverbialClause 218 as it describes the relationship between two words, weather 202 and hot 206—ACL (Weather, Hot).

The semantic frame 200 further specifies contextual information for a subset of the words in the utterance. "weather.n (weather)" 207 indicates that weather is used as a noun (weather.n). (Weather) is an indication of a frame entry in a frame corpus for weather in this context. For example, the chatbot system 100 may store a frame entry Weather with information such as the definition for weather and various words that are associated with weather. Alternatively or additionally, the chatbot system 100 may be coupled to an external frame corpus such as FrameNet or PropBank. As a specific example, the semantic frame 200 may include a link to a FrameNet Weather frame entry which includes the variables PLACE, TIME, CONDITION, and SPECIFICATION (e.g., a further specification of the weather condition). For example, in the sentence "There was heavy rain this morning," the relations and values WEATHER—rain, TIME—this morning, and SPECIFICATION—heavy can be identified. Similarly, "hot.a (Temperature) 208 indicates a frame entry Temperature which includes words, definitions, and contextual information associated with the word hot, when used in the context of an adjective describing temperature. The frame indicators 207 and 208 provide additional lexical information about the values in the utterance, which can also be useful in determining intents for utterances.

The word "The" in the utterance is not assigned a relation in the semantic frame. Such words that are not useful in discerning the meaning of the utterance may be ignored or discarded in generating a semantic frame.

FIG. 2B illustrates another example of a semantic frame 220 according to some aspects. The semantic frame 220 is for an utterance 221 "I would like to send money from my savings." The semantic frame 220 includes relations 232-250 and corresponding values 222-230. Several words in the utterance 221 are not used in the semantic frame—"I would like to."

The relation Root 232 corresponds to the value send 222. The relation ObjectSimple 234 corresponds to the value money 224. The relation PrepositionalModifier 236 corresponds to the value from 226. The relation AdjectivalModifier 238 corresponds to the value my 228. The relation Case_240 corresponds to the value savings 230. The relation Subject 242 corresponds to the values money 224 and send 222. The relation PrepositionalClause (PCL) 244 corresponds to the values savings 230 and from 226. The relation AdjectivalClause (ACL) 246 corresponds to the values savings 230 and my 228.

The semantic frame 200 further specifies frame entries for a subset of the words in the utterance. "send.v (Sending)" 242 indicates that send is used as a verb, and specifies a particular frame entry for Sending in this context. Similarly, "money.n (Money)" indicates a Money frame entry 250, which includes words, definitions, and contextual information associated with the word money."

Identifying an Intent Using a Semantic Frame

Figure 3:
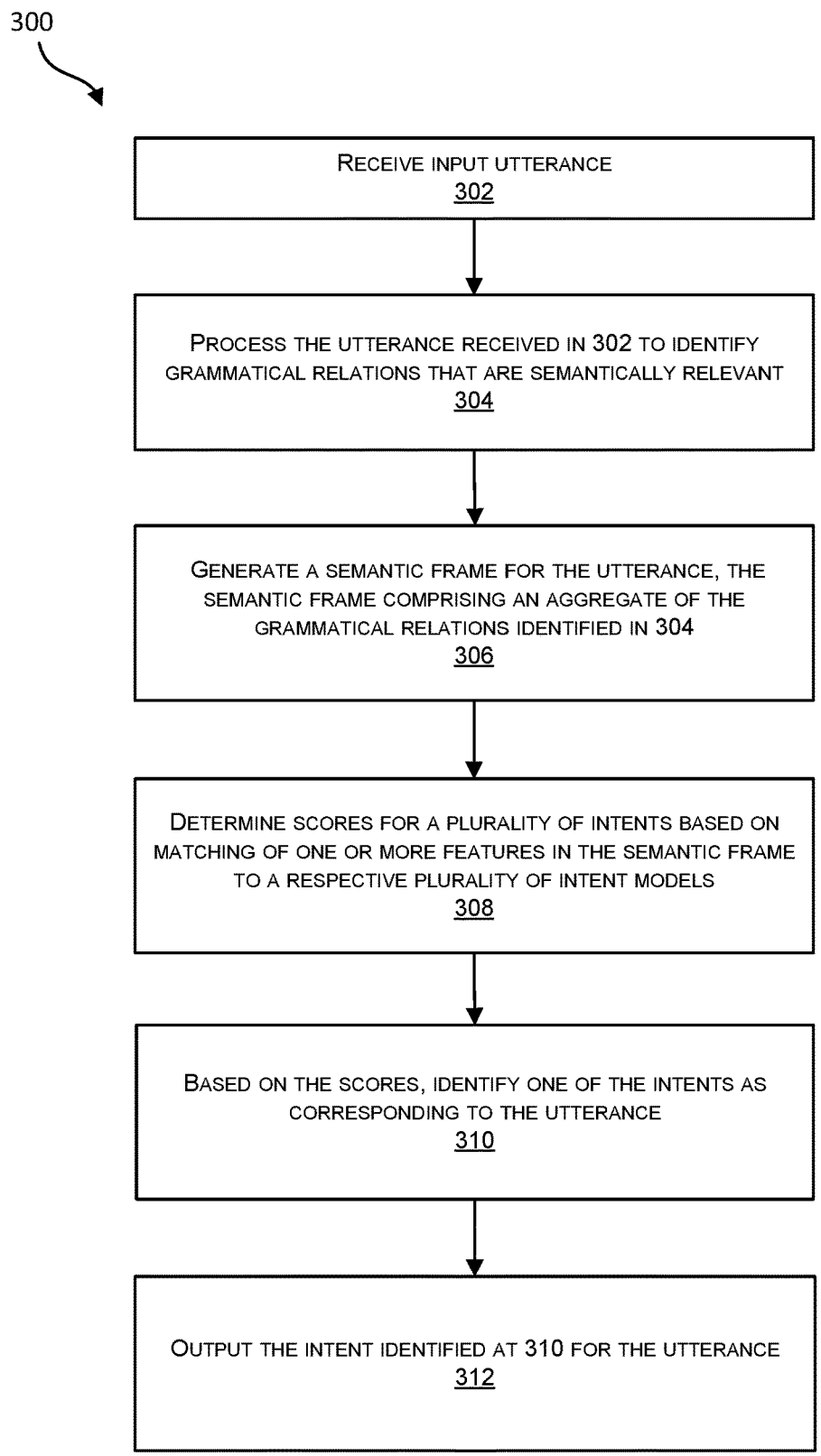
FIG. 3 is a simplified flowchart depicting a process for determining an intent using a semantic frame according to some embodiments.

FIG. 3 is a simplified flowchart depicting a process 300 for identifying an intent for an utterance using a semantic frame according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The methods presented in FIG. 3 and described below is intended to be illustrative and non-limiting. Although FIG. 3 depicts the various processing steps occurring in a particular sequence or order, this is not intended to be limiting. In certain alternative embodiments, the processing may be performed in some different order or some steps may also be performed in parallel. The processing depicted in FIG. 3 may be performed by the NLU subsystem 120 and other components of the chatbot system 100 illustrated in FIG. 1.

At 302, the chatbot system receives an input utterance. The chatbot system may receive the input utterance in text form (e.g., as a text utterance). For example, a user types in text during a chat, which is received by the chatbot system. The input utterance may be in a particular language and be in a natural language query form. The spoken utterance may specify a question that the user wants the chatbot system to answer, specify one or more actions that the user wants the chatbot system to initiate (e.g., "I would like a medium pepperoni pizza."), and the like.

In certain embodiments, instead of receiving a text utterance, the chatbot system receives a spoken utterance. A spoken utterance may, for example, be received from a user via a speech input component such as a microphone in communication with the chatbot system. The spoken utterance may be received as a wave form. The techniques described in this disclosure can be used with systems that receive input in the form of spoken speech, or text input, or combinations thereof.

At 304, the chatbot system processes the utterance received in 302 to identify grammatical relations that are semantically relevant. Processing the utterance may include generating (e.g., by the ASR subsystem) a text utterance based upon the spoken utterance, in the case that a spoken utterance is received. The NLU subsystem may process a text utterance, either received from the ASR subsystem or directly from a user, by identifying words and performing named entity linking, slot filling, and other tasks.

In some aspects, processing the utterance includes determining a language of the utterance. The language may be determined, for example, by identifying key words in the utterance. Based upon the language determined, the chatbot system may identify a set of rules to be used for analyzing the utterance. The set of rules identified can be language-specific. For example, if the utterance is an English sentence, the rules identified may correspond to rules for analyzing the sentence structure and applying syntax rules for the English language.

In certain embodiments, processing the utterance includes parsing the utterance to determine the following:
Tokens: e.g., [I, would, like, to, open, a, checking, account, and, transfer, money, from, it].
POS tags: e.g., for the utterance above, the following sequence of tags can extracted: [personal pronoun (PRP), modal (MD), verb (VB), the word "to", VB, determiner (DT), noun (NN), NN, coordinating conjunction (CC), VB, NN, preposition (IN), PRP].
Named entities: e.g., [checking]
Lemmas: e.g., [I, would, like, to, open, a, . . . ]
Dependencies: dependencies indicate relationships between words (which may be tokenized) in an utterance. Examples of dependencies include subjects, prepositional objects, auxiliaries (e.g., the non-main verb in a clause with multiple verbs), conjuncts, and the like. For instance, in the utterance above (I, like) is a subject and (would, like) is an auxiliary. In certain embodiments, the dependencies are used to generate a dependency tree.

Using the identified rules and parsed information, the chatbot system identifies semantically relevant grammatical relations. As illustrated in FIGS. 2A and 2B, often an utterance will include words that are not semantically relevant. For example, for three utterances
Utt1: I would like to order pizza.
Utt2: Order pizza.
Utt3: Can I order pizza?
, the semantically relevant relation is the same—directObject (order, pizza). Utterances 1 and 3 include additional words that are not semantically relevant ("I would like to" and "Can I"). The chatbot system identifies those words that are semantically relevant for intent determination purposes. This may be accomplished using rules or machine learning to correlate the words in the utterance with established features.

At 306, the chatbot system generates a semantic frame for the utterance. The semantic frame is an aggregate of the grammatical relations identified in 304. As described above with respect to FIGS. 1 and 2, the semantic frame may include a plurality of relations which designate grammatical constructs for a given linguistic unit (e.g., ObjectSimple: money and directObject send/money). Some relations define a relationship between multiple words (e.g., directObject send/money specifies that money is the object of the verb send). Some of these relations may indicate additional contextual information for a word (e.g., information, or a link to a frame corpus entry, defining the linguistic context of the word). By mapping the semantics of the structured utterance to a structured frame representation, the constructs can define the relationship between the lexical items and separate the content from grammatical constructs. The chatbot system may refrain from including information that is not semantically relevant in semantic frames.

Generating the semantic frame may include establishing relations for the utterance in an organized manner. For example, as illustrated in FIGS. 2A and 2B, the dialog system may identify words in the utterance and label each word with one or more relations (e.g., as shown in FIG. 2B, the word "send" 222 is associated with multiple relations—root 232, subject (money/send) 242, and send.v (Sending) 248). The chatbot system may, for example, generate the semantic frame based on analysis of a dependency tree. The chatbot system may use a dependency tree as generated at 304 to identify parts of speech and dependencies, which can be used to match words to relations using rules and/or machine learning. In some aspects, the semantic frame is encoded as a set of word embeddings containing a separate embedding for each word in the utterance, where each embedding is a multi-dimensional feature vector containing values for relations of a corresponding word. Alternatively, or additionally, the semantic frame may be stored in a table format or other suitable formats.

In some aspects, named entities can be generalized into their corresponding type. For example, the value John can be generalized to PERSON for the purposes of generating the semantic frame. The value Karen can also be generalized to PERSON for the semantic frame.

The value today can be generalized to TEMPORAL for the semantic frame. The value next month can also be generalized to TEMPORAL for the semantic frame. This can facilitate matching to the intent model. For example, generalizing proper names for people to PERSON enables a match to the appropriate intent with PERSON as a value without requiring the intent model to recognize every possible name.

In some aspects, multiword names can be matched both at a keyword level and also flagged as a multiword name. For example, in the utterance "show me The Courts of Chaos", "The Courts of Chaos" can be matched at the keyword level and also flagged as a multiword name.

In some cases, an utterance is a one-word utterance. For example, the chatbot system may receive a one-word utterance such as "Drive!", "Stop," or "Cancel." The chatbot system may identify a relation for the one-word utterance (e.g., Root (Drive)). Alternatively, or additionally, the chatbot system may infer a relation for a simple utterance. For example, based on geographic context (e.g., identified using GPS), temporal context (e.g., identified using a system clock), or conversation-level context (e.g., identified from a prior utterance in a conversation), the chatbot system may infer a relation. As a specific example, if the chatbot system is part of a vehicle, and the prior utterance is "Drive!," and a current state of the vehicle is accelerating, the chatbot system may infer the grammatical relation for a second utterance, "Stop!"—directObject: stop/accelerating.

At 308, the chatbot system determines scores for a plurality of intents based on matching of one or more relations in the semantic frame to a respective plurality of intent models. As described above with respect to FIG. 1, each intent model may be a multi-key map of features and values for each intent. The chatbot system may compare each relation in semantic frame of the utterance to features associated with different intents to calculate a score for each intent based on the degree of matching between relations in the semantic frame and corresponding features associated with the intents. The features associated with the intents include grammatical relations previously determined based on linguistic analysis of training utterances provided for the intents. The score for an intent can be weighted such that features which are of greater semantic relevance contribute more to the score than features which are less relevant.

The chatbot system may determine the score, for a given intent, by determining a level of overlap between an utterance semantic frame and the corresponding intent model. In some embodiments, the score is, or is derived from, an overlap coefficient. For example, the level of overlap can be measured using a Szymkiewicz-Simpson coefficient. The Szymkiewicz-Simpson coefficient measures the overlap between two finite sets (X, Y) using the function:

$$\text{Overlap}(X, Y) = \frac{|X \cap Y|}{\min(|X|, |Y|)} \quad [1]$$

Thus, the overlap computed using Equation [1] can produce a score indicative of the level of matching between the various relations in the semantic frame for the utterance and the features in the intent model for each potential intent. The score may be the overlap itself as computed using Equation [1], or may be a function of the overlap. Alternatively, other algorithms may be used to generate the score, such as a Jaccard index (see, e.g., Real et al, *The Probabilistic Basis of Jaccard's Index of Similarity*, Systematic Biology, September 1996), or Bayesian matching (see, e.g., Wertheimer, *Bayesian Analysis for Probability-Matching*, Stanford Computation and Cognition Lab, 2015).

As an example, the chatbot system has hundreds of intent models stored corresponding to system-capable functions. The chatbot system has generated a semantic frame for the utterance "Order a pepperoni pizza please." The semantic frame includes the grammatical relations directObject: order, pizza
adjectivalClause: pizza, pepperoni
ObjectSimple: pizza and
Attempt_obtain_food_scenario For each of the intent models, the chatbot system computes an overlap score based on the generated semantic frame. The overlap between the intent model and the semantic frame is equal to a maximum value of 1 for the intent model Order_Food, as the Order_Food model includes the key-value pairs DirectObject—order, pizza and
adjectivalClause—pizza, pepperoni and
Attempt_obtain_food_scenario Such an intent model may include various other key-value pairs that are associated with ordering food such as DirectObject—deliver, Chinese
DirectObject—order, takeout
AdverbialClause—deliver, now
AdjectiveClause—Chow Mein, spicy and so forth. A lower overlap score is generated for anther intent, Find_Recipe, which includes key-value pairs such as DirectObject—find, recipe
DirectObject—look up, ingredients
AdjectivalClause—pizza, pepperoni
Adjectival Clause—cake, Black Forest and so forth. The key-value pair AdjectivalClause—pizza, pepperoni is also in the intent model for Find_Recipe, but the other relation identified in the utterance is not present. Accordingly, the match score for Find_Recipe is lower than that for Order_Food.

In some embodiments, the score is determined based on weights assigned to each of the respective features in the intent model. In some aspects, weights are built into the intent models. For example, the intent model for Order_Food may weight DirectObject features more heavily than other features such as an adverbial clause. For example, the features in the intent model may be weighted as follows:

Subject(1.5),
PassiveSubject(2.5),
PassiveAuxiliary(1.5),
DirectObject(2.5),
AdverbialModifier(1.0),
NounModifier(1.0),
Root(0.3),
AdjectiveModifier(1.0),
AdjectiveModifierToRoot(1.0),
Case_(1.0),
ObjectSimple(0.3),
UH(1.0),
Greetings(5.5),
TemporalModifier(1.0),
Compound(1.0),
OpenClausalComplement(1.0),
AdverbialClause(0.8),
AdjectivalClause(0.5),
MultiWordName(1.0),
Negation(0.5).

When the overlap score is computed, the weighted model can result in features that are more relevant to an intent having a greater bearing on the intent matching score generation. Alternatively, or additionally, the weights may be applied as part of the scoring process (e.g., without being built into the model itself). For example, the chatbot system may match feature, word pairs in the semantic frame and in the intent model, then apply a weight to matching pairs. As a specific example, a match may result in a binary 1 or 0, which is then augmented by a weighting factor based on feature type. If both the features ObjectSimple=pizza and AdjectivalClause (pizza, pepperoni) are present in an utterance, each are scored with 1 based on the intent model. Then, weights can be applied (e.g., using the weights indicated above), such that the direct object contributes 2.5 to the intent matching score, and the adjectival clause contributes 0.5 to the intent matching score.

In the case of one-word utterances or other utterances that do not have meaningful dependency definitions, scores may be calculated using a different technique. For example, scores for one-word utterances can be calculated using naive Bayes classification to determine the probability that the one-word utterance corresponds to a particular intent. This can be performed using the function $$\text{Naïve Bayes } P(\text{Intent}|\text{term}) \quad [2]$$

to arrive at the scores for the plurality of intents.

At 310, based on the scores, the chatbot system identifies one of the intents as corresponding to the utterance. In some embodiments, the chatbot system identifies a highest-scoring intent as being the intent of the utterance. For example, if fifty scores were generated for fifty different intents, ranging from 0.1 to 0.99, the dialog system selects the intent with the score of 0.99 for the utterance. Alternatively, or additionally, the chatbot system may select an intent with a score that exceeds a preconfigured threshold value (e.g., select an intent if the score is 0.95 or greater).

At 312, the chatbot system outputs the intent identified at 310 for the utterance. The chatbot system may output the identified intent to a downstream consumer of intent such as a dialog manager subsystem of the chatbot system, an external consumer of intent (e.g., another system that uses the intent identification as a service), or the like.

In some embodiments, the chatbot system prepares a response and/or performs an action based on the intent. For example, after determining the intent Order_Pizza based on a received utterance, the dialog system may order a pizza by preparing and transmitting an order via an Application Program Interface (API) exposed by a computer of a pizza restaurant. If the intent and underlying information indicate that further information is required, then the chatbot system may prepare and output a response to the user (e.g., via text or spoken speech) requesting the required information. As a specific example, responsive to the utterance "Call John," the chatbot system prepares and displays the text output "Do you want to call John Jacobs or John Wu?" As another example, the chatbot system may, based on the identified intent Check_Weather, perform a search to identify the current weather in the current location, and generate and output a natural language response, "Today is sunny with a current temperature of 73 degrees and a high of 82 degrees."

In a chatbot system architecture where a master bot interfaces with multiple skill bots, the processing depicted in FIG. 3 may be performed at the master bot level and/or at the skill bot level. For example, at the master bot level, based upon the intent identified in 310 the master bot may identify one or more specific skill bots to which the sentence is to be routed for further handling.

Alternatively, or additionally, each intent in the set of intents is handled by a particular skill bot. Each skill bot may be configured to handle multiple intents. At the skill bot level, as part of the processing in 310, the intent identified may be used by the skill bot to determine one or more actions to be performed. The intent identified in 310 may also be used by the skill bot to identify responses to be generated for the utterance based on the identified intent.

Generating an Intent Model

Figure 4:
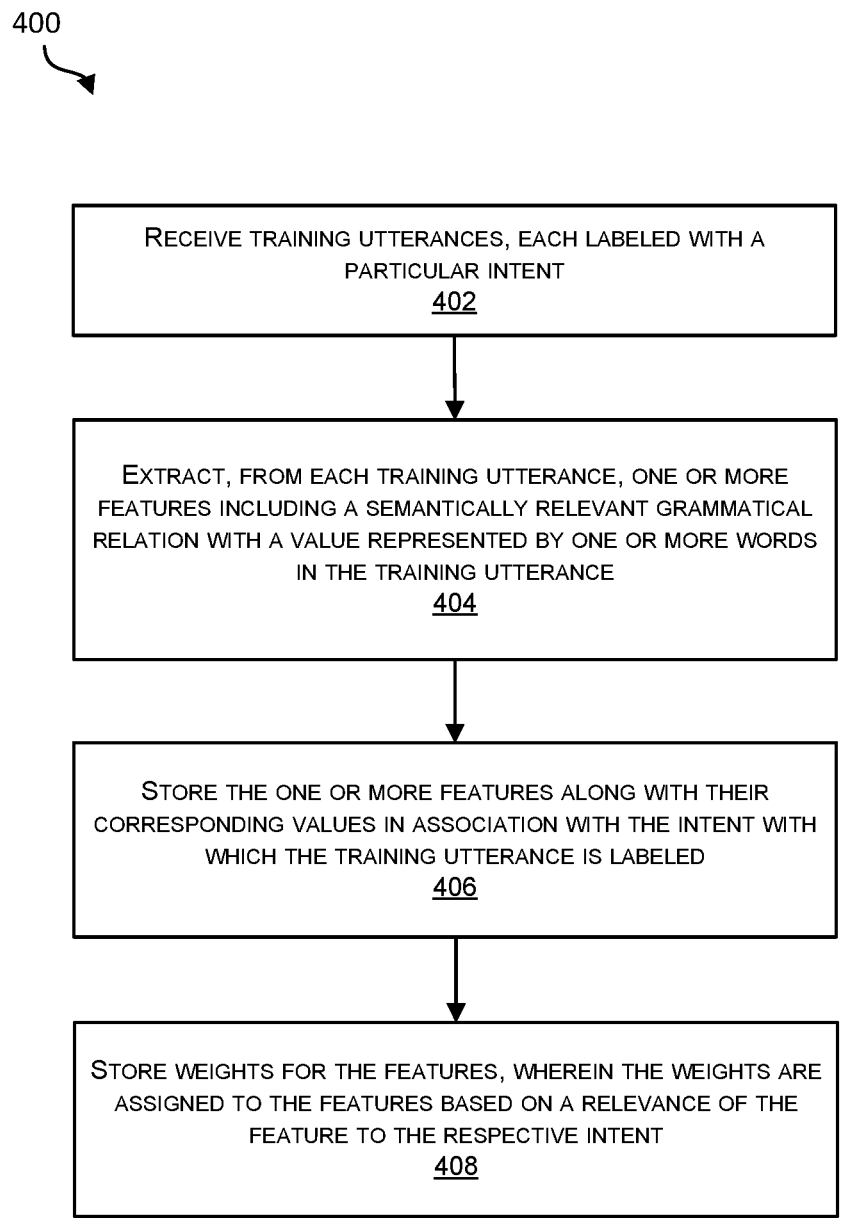
FIG. 4 is a simplified flowchart depicting a process for building an intent model according to certain embodiments.

FIG. 4 is a simplified flowchart depicting a process 400 for building an intent model according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The methods presented in FIG. 4 and described below is intended to be illustrative and non-limiting. Although FIG. 4 depicts the various processing steps occurring in a particular sequence or order, this is not intended to be limiting. In certain alternative embodiments, the processing may be performed in some different order or some steps may also be performed in parallel. The processing depicted in FIG. 4 may be performed by the NLU subsystem 120 and other components of the chatbot system 100 illustrated in FIG. 1.

At 402, the chatbot system receives a set of training utterances, each training utterance labeled as being associated with a particular intent from a set of intents. The training utterances may be manually labeled and received by the chatbot system as a file or other data element. Alternatively, or additionally, the chatbot system may itself label the utterances. The utterances may represent the sort of input the chatbot system is likely to receive, labeled with system-capable intents. For example, the labeled set of training utterances may include:

Please order a large pepperoni pizza from Luigi's.—Order_Pizza

Order pizza.—Order Pizza

Update expense report to include the pizza I bought.—Update_File

Is it going to rain tonight?—Check_Weather and so forth.

At 404, for each training utterance, the chatbot system extracts, from the training utterance, one or more features. For each training utterance, the chatbot system performs linguistic analysis on the utterance, based on a set of rules, to identify the features. Each feature may correspond to a value represented by one or more words included in the utterance. The features include semantically relevant grammatical relations. For example, in the training utterance "I would like to check my balance", the word "balance" is a value for an ObjectSimple feature, and the set of words (check, balance) is a value for a DirectObject feature, which expresses the relationship between the words check and balance. Some features may include contextual information defining a word and/or link to additional information about one or more words (e.g., a frame entry).

Performing the linguistic analysis of the training utterance may include parsing the training utterance and generating a semantic frame in a similar fashion as described above with respect to blocks 304 and 306 of FIG. 3. In some aspects, the chatbot system builds a dependency tree. The chatbot system may generate a semantic frame for the training utterance, e.g., by parsing a generated dependency tree to identify relations for words in the training utterance. The identified relations are selected as features for the labeled intent.

At 406, the chatbot system stores the features and values identified in 404 in association with their corresponding intents. The features and values are stored in association with the intent with which the training utterance is labeled. For example, the features, values, and intents may be stored as a respective plurality of intent models. As described above with respect to FIGS. 1 and 3, each intent may have a respective intent model, which may be a multi-key map that includes a plurality of different features (keys) for that intent. Each key can have multiple values. For example, for the intent Find_Directions, features include Root and DirectObject. The feature Root could include multiple possible values for the intent Find_Directions, such as navigate, find, and get. The feature DirectObject could include multiple possible values for the intent Find_Directions, such as (navigate, Costco®), (find, coffee shop), and so forth.

In some embodiments, the intent models are implemented as rules-based models. The intent models may employ rules that are configured for determining whether an utterance is a match to a particular system intent. For example, the rules may include, for each system intent or skill bot, a corresponding regular expression (regex) that defines a search pattern for an utterance. For instance, a regex for a pizza ordering intent may specify that, in order for an utterance to match to the pizza ordering intent, the utterance must contain the word "pizza" in combination with at least one word among a set of synonyms for placing an order (e.g., "order," "buy," "purchase," etc.).

Alternatively, or additionally, the intent model is implemented using a machine-learning model. The intent model may, for example, be a neural network such as a perceptron algorithm or a logistic regression algorithm. Training of the machine-learning model may involve inputting example utterances associated with various intents to generate, as an output of the machine-learning model, inferences as to the most likely intent corresponding to an input utterance. For each training utterance, an indication of the correct intent for the training utterance may be provided as ground truth information. The behavior of the machine-learning model can then be adapted (e.g., through back-propagation) to minimize the difference between the generated inferences and the ground truth information.

In some embodiments, the results of the model generation are smoothed using a function such as Softmax. Parameters of the intent models may be smoothed to prevent the model from predicting labels too confidently during training and generalizing poorly. Label smoothing techniques are described in, e.g., Lukasik et al., Does Label Smoothing Mitigate Label Noise?, arXiv:2003.02819 (2020).

At 408, the chatbot system stores weights for the features. The weights are assigned to the features based on a relevance of each feature to the respective intent. For example, the subject of an utterance tends to have more relevance to the intent of an utterance than an adjective. As described above with respect to block 308, the weighting may be implemented in some aspects by weighting key-value pairs in the intent model. The chatbot system may store, for each intent model, mappings including features, values, and weights in association with a given intent.

The stored features and values are subsequently made accessible to an intent classifier during runtime analysis of an input utterance. For example, the generated intent models are used at block 308 of FIG. 3 to determine scores for a plurality of intents, which are then used to identify an intent for an utterance.

Example Computing Environments for Implementing a Chatbot System

Figure 5:
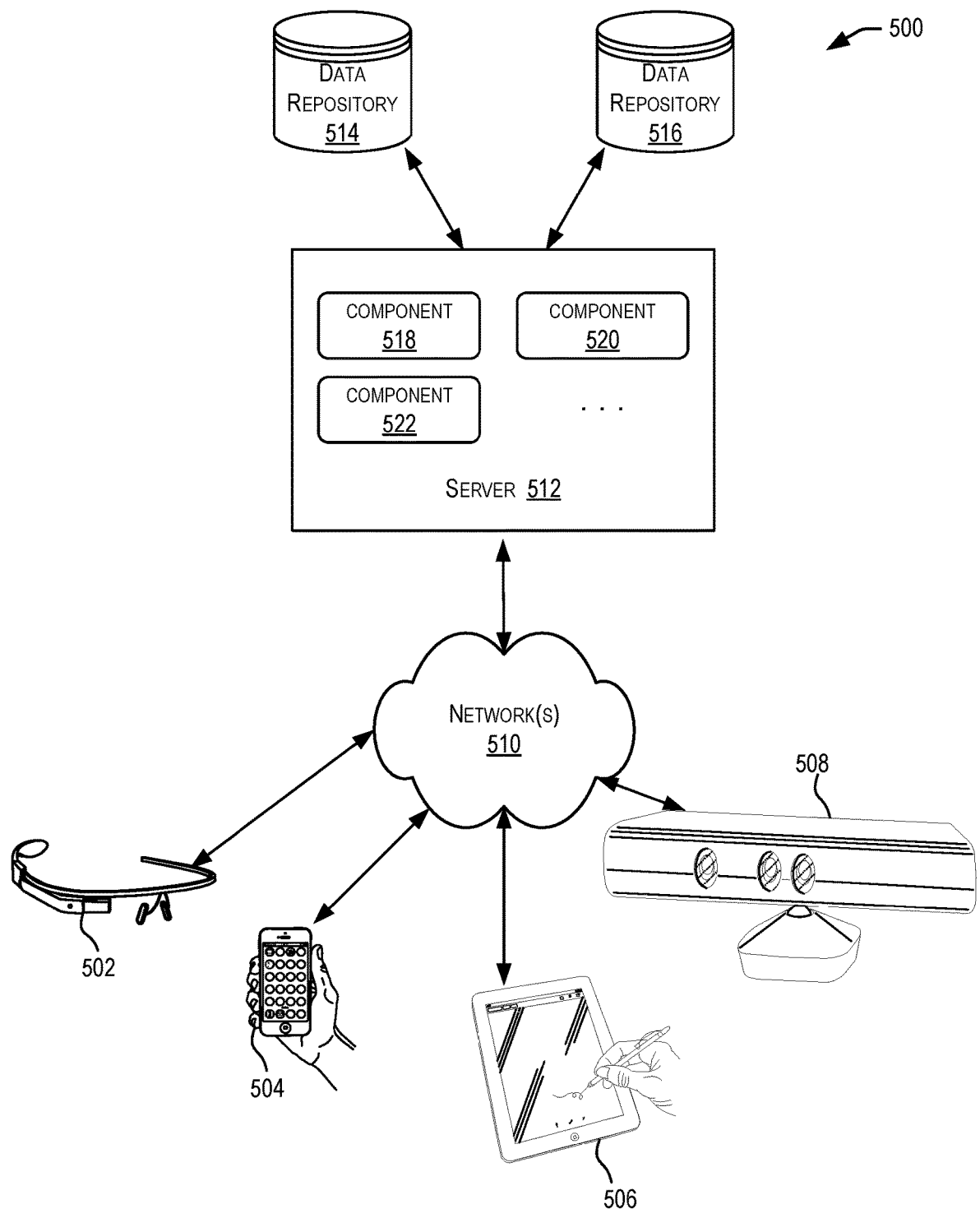
FIG. 5 depicts a simplified diagram of a distributed system for implementing an embodiment.

FIG. 5 depicts a simplified diagram of a distributed system 500 for implementing an embodiment. In the illustrated embodiment, distributed system 500 includes one or more client computing devices 502, 504, 506, and 508, coupled to a server 512 via one or more communication networks 510. Client computing devices 502, 504, 506, and 508 may be configured to execute one or more applications.

In various embodiments, server 512 may be adapted to run one or more services or software applications that enable the processing described in this disclosure.

In certain embodiments, server 512 may also provide other services or software applications that can include non-virtual and virtual environments. In some embodiments, these services may be offered as web-based or cloud services, such as under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in FIG. 5, server 512 may include one or more components 518, 520 and 522 that implement the functions performed by server 512. These components may include software components that may be executed by one or more processors, hardware components, or combinations thereof. It should be appreciated that various different system configurations are possible, which may be different from distributed system 500. The embodiment shown in FIG. 5 is thus one example of a distributed system for implementing an embodiment system and is not intended to be limiting.

Users may use client computing devices 502, 504, 506, and/or 508 to interact with server 512 in accordance with the teachings of this disclosure. A client device may provide an interface that enables a user of the client device to interact with the client device. The client device may also output information to the user via this interface. Although FIG. 5 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 510 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 510 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 512 can include one or more virtual machines running virtual operating systems, or other computing architectures involving virtualization such as one or more flexible pools of logical storage devices that can be virtualized to maintain virtual storage devices for the server. In various embodiments, server 512 may be adapted to run one or more services or software applications that provide the functionality described in the foregoing disclosure.

The computing systems in server 512 may run one or more operating systems including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more data repositories 514, 516. These data repositories may be used to store data and other information in certain embodiments. For example, one or more of the data repositories 514, 516 may be used to store data or information generated by the processing described herein and/or data or information used for the processing described herein. Data repositories 514, 516 may reside in a variety of locations. For example, a data repository used by server 512 may be local to server 512 or may be remote from server 512 and in communication with server 512 via a network-based or dedicated connection. Data repositories 514, 516 may be of different types. In certain embodiments, a data repository used by server 512 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 514, 516 may also be used by applications to store application data. The data repositories used by applications may be of different types such as, for example, a key-value store repository, an object store repository, or a general storage repository supported by a file system.

Figure 6:
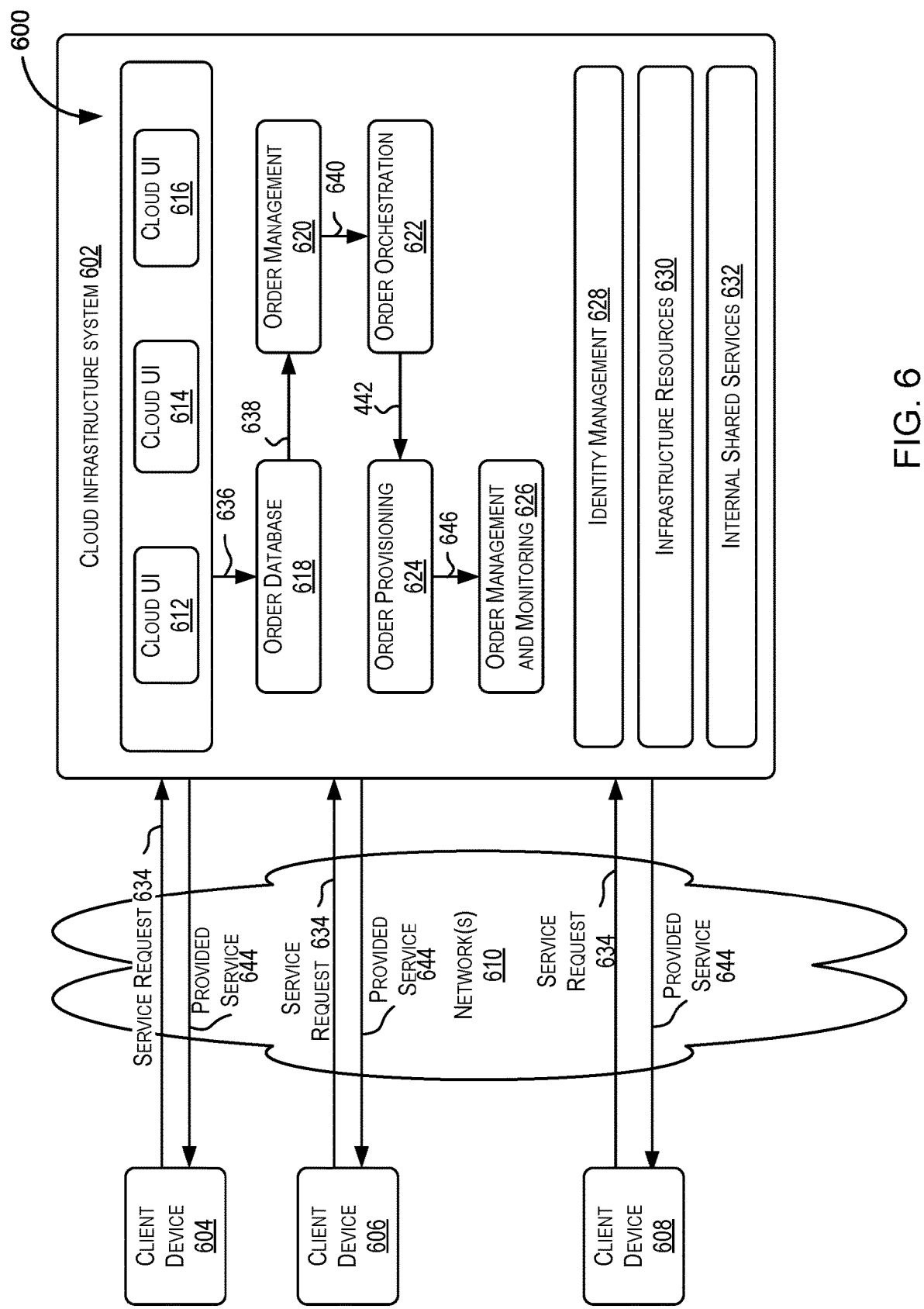
FIG. 6 is a simplified block diagram of a cloud-based system environment offering cloud services, in accordance with certain embodiments.

In certain embodiments, the functionalities described in this disclosure may be offered as services via a cloud environment. FIG. 6 is a simplified block diagram of a cloud-based system environment in which functionalities described herein may be offered as cloud services, in accordance with certain embodiments. In the embodiment depicted in FIG. 6, cloud infrastructure system 602 may provide one or more cloud services that may be requested by users using one or more client computing devices 604, 606, and 608. Cloud infrastructure system 602 may comprise one or more computers and/or servers that may include those described above for server 512. The computers in cloud infrastructure system 602 may be organized as general purpose computers, specialized server computers, server farms, server clusters, or any other appropriate arrangement and/or combination.

Network(s) 610 may facilitate communication and exchange of data between clients 604, 606, and 608 and cloud infrastructure system 602. Network(s) 610 may include one or more networks. The networks may be of the same or different types. Network(s) 610 may support one or more communication protocols, including wired and/or wireless protocols, for facilitating the communications.

The embodiment depicted in FIG. 6 is only one example of a cloud infrastructure system and is not intended to be limiting. It should be appreciated that, in some other embodiments, cloud infrastructure system 602 may have more or fewer components than those depicted in FIG. 6, may combine two or more components, or may have a different configuration or arrangement of components. For example, although FIG. 6 depicts three client computing devices, any number of client computing devices may be supported in alternative embodiments.

The term cloud service is generally used to refer to a service that is made available to users on demand and via a communication network such as the Internet by systems (e.g., cloud infrastructure system 602) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 602 may provide one or more cloud services using different models such as under a Software as a Service (SaaS) model, a Platform as a Service (PaaS) model, an Infrastructure as a Service (IaaS) model, and others, including hybrid service models. Cloud infrastructure system 602 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 602. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 602. Cloud infrastructure system 602 then performs processing to provide the services requested in the customer's subscription order. For example, in certain embodiments, the chatbots-related functions described herein may be provided as cloud services that are subscribed to by a user/subscriber. Cloud infrastructure system 602 may be configured to provide one or even multiple cloud services.

Cloud infrastructure system 602 may provide the cloud services via different deployment models. In a public cloud model, cloud infrastructure system 602 may be owned by a third party cloud services provider and the cloud services are offered to any general public customer, where the customer can be an individual or an enterprise. In certain other embodiments, under a private cloud model, cloud infrastructure system 602 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 602 and the services provided may be shared by several organizations in a related community. Various other models such as hybrids of the above mentioned models may also be used.

Client computing devices 604, 606, and 608 may be of different types (such as devices 502, 504, 506, and 508 depicted in FIG. 5) and may be capable of operating one or more client applications. A user may use a client device to interact with cloud infrastructure system 602, such as to request a service provided by cloud infrastructure system 602. For example, a user may use a client device to request a chatbot-related service described in this disclosure.

In some embodiments, the processing performed by cloud infrastructure system 602 may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 6, cloud infrastructure system 602 may include infrastructure resources 630 that are utilized for facilitating the provision of various cloud services offered by cloud infrastructure system 602. Infrastructure resources 630 may include, for example, processing resources, storage or memory resources, networking resources, and the like.

In certain embodiments, to facilitate efficient provisioning of these resources for supporting the various cloud services provided by cloud infrastructure system 602 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 602 may itself internally use services 632 that are shared by different components of cloud infrastructure system 602 and which facilitate the provisioning of services by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 602 may comprise multiple subsystems. These subsystems may be implemented in software, or hardware, or combinations thereof. As depicted in FIG. 6, the subsystems may include a user interface subsystem 612 that enables users or customers of cloud infrastructure system 602 to interact with cloud infrastructure system 602. User interface subsystem 612 may include various different interfaces such as a web interface 614, an online store interface 616 where cloud services provided by cloud infrastructure system 602 are advertised and are purchasable by a consumer, and other interfaces 618. For example, a customer may, using a client device, request (service request 634) one or more services provided by cloud infrastructure system 602 using one or more of interfaces 614, 616, and 618. For example, a customer may access the online store, browse cloud services offered by cloud infrastructure system 602, and place a subscription order for one or more services offered by cloud infrastructure system 602 that the customer wishes to subscribe to. The service request may include information identifying the customer and one or more services that the customer desires to subscribe to.

In certain embodiments, such as the embodiment depicted in FIG. 6, cloud infrastructure system 602 may comprise an order management subsystem (OMS) 620 that is configured to process the new order. As part of this processing, OMS 620 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 620 may then invoke the order provisioning subsystem (OPS) 624 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 602 may send a response or notification 644 to the requesting customer to indicate when the requested service is now ready for use. In some instances, information (e.g., a link) may be sent to the customer that enables the customer to start using and availing the benefits of the requested services.

Cloud infrastructure system 602 may provide services to multiple customers. For each customer, cloud infrastructure system 602 is responsible for managing information related to one or more subscription orders received from the customer, maintaining customer data related to the orders, and providing the requested services to the customer. Cloud infrastructure system 602 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 602 may provide services to multiple customers in parallel. Cloud infrastructure system 602 may store information for these customers, including possibly proprietary information. In certain embodiments, cloud infrastructure system 602 comprises an identity management subsystem (IMS) 628 that is configured to manage customers information and provide the separation of the managed information such that information related to one customer is not accessible by another customer. IMS 628 may be configured to provide various security-related services such as identity services, such as information access management, authentication and authorization services, services for managing customer identities and roles and related capabilities, and the like.

Figure 7:
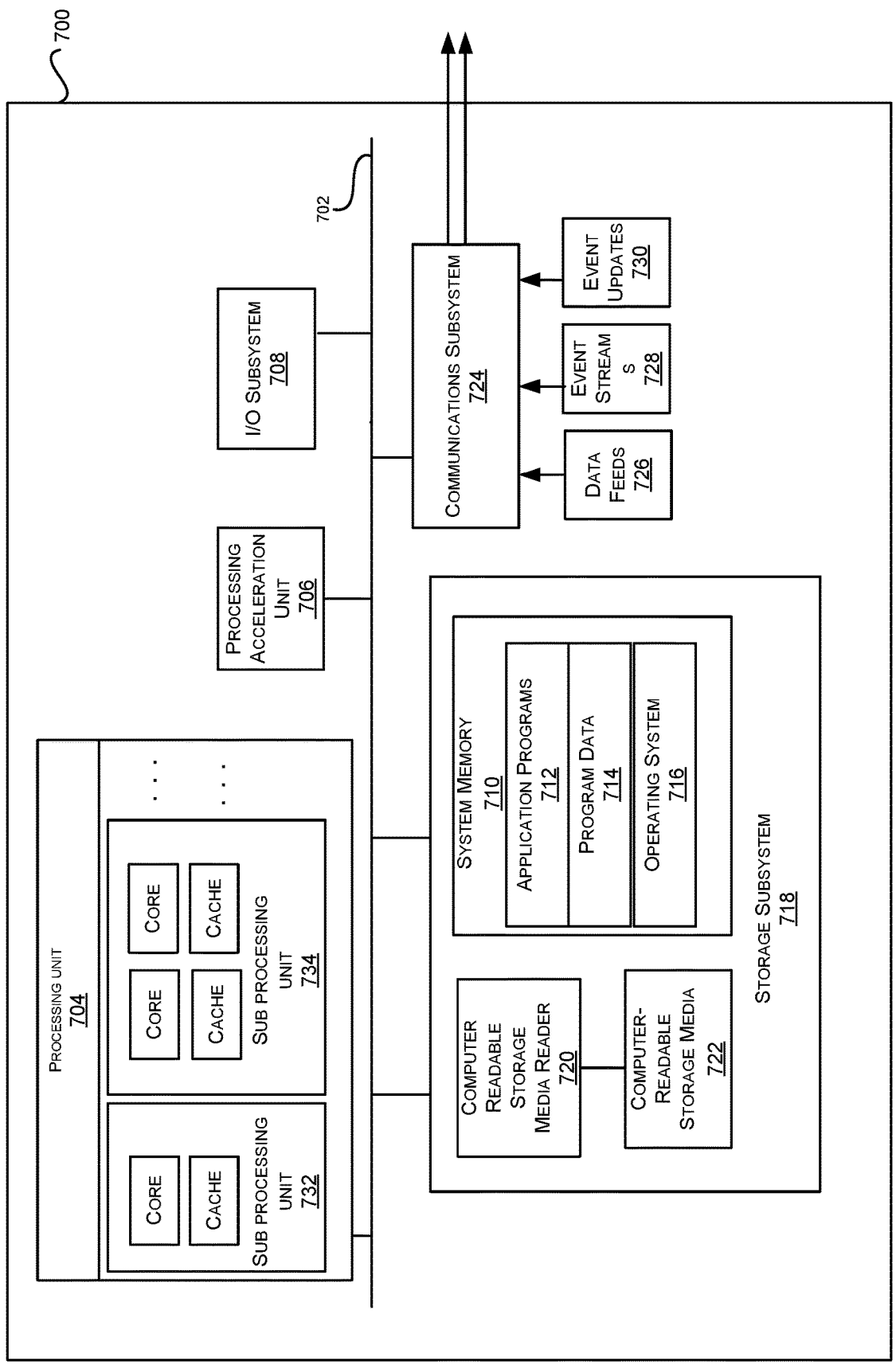
FIG. 7 illustrates an exemplary computer system that may be used to implement certain embodiments.

FIG. 7 illustrates an exemplary computer system 700 that may be used to implement certain embodiments. For example, in some embodiments, computer system 700 may be used to implement any of the system and subsystems of a chatbot system, and various servers and computer systems described above. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may include be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine.

In certain embodiments, a processing acceleration unit 706 may optionally be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google) Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some embodiments. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 722 may store programming and data constructs that provide the functionality of some embodiments. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, DVD, a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 718 may also include a computer-readable storage media reader 720 that can further be connected to computer-readable storage media 722. Reader 720 may receive and be configured to read data from a memory device such as a disk, a flash drive, etc.

In certain embodiments, computer system 700 may support virtualization technologies, including but not limited to virtualization of processing and memory resources. For example, computer system 700 may provide support for executing one or more virtual machines. In certain embodiments, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method for identifying an intent, the method comprising:
   receiving, by a computer system, an utterance;
   generating, by the computer system, a semantic frame for the utterance, wherein the semantic frame is a structured construction of how words in the utterance function and relate to one another, and wherein generating the semantic frame comprises identifying one or more semantically relevant grammatical relations for inclusion in the semantic frame;

determining, by the computer system, a plurality of scores for a respective plurality of intents based on matching of a particular relation in the semantic frame to a plurality of features associated with the plurality of intents, wherein determining each score, of the plurality of scores, comprises determining a level of overlap between an intent model for an intent, of the plurality of intents, and the semantic frame, wherein the level of overlap is determined by computing an overlap coefficient;

identifying, by the computing system based on the scores, a particular intent, of the plurality of intents, as corresponding to the utterance;

generating, by the computing system, a response based on the identified intent; and transmitting, by the computing system, the response as output.

2. The method of claim 1, wherein the overlap coefficient is a Szymkiewicz-Simpson coefficient.

3. The method of claim 1, wherein the intent model is a multi-key map of features to words.

4. The method of claim 1, wherein the score is determined based on weights assigned to each of the respective features in the intent model.

5. The method of claim 1, wherein the relations correspond to parts of speech defining relationships between words.

6. A non-transitory computer readable medium storing a plurality of instructions executable by one or more processors for identifying an intent, wherein the plurality of instructions, when executed by the one or more processors, causes the one or more processors to perform processing comprising:

receiving, by a computer system, an utterance;

generating, by the computer system, a semantic frame for the utterance, wherein the semantic frame is a structured construction of how words in the utterance function and relate to one another, and wherein generating the semantic frame comprises identifying one or more semantically relevant grammatical relations for inclusion in the semantic frame;

determining, by the computer system, a plurality of scores for a respective plurality of intents based on matching of a particular relation in the semantic frame to a plurality of features associated with the plurality of intents, wherein determining each score, of the plurality of scores, comprises determining a level of overlap between an intent model for an intent, of the plurality of intents, and the semantic frame, wherein the level of overlap is determined by computing an overlap coefficient;

identifying, by the computing system based on the scores, a particular intent, of the plurality of intents, as corresponding to the utterance;

generating, by the computing system, a response based on the identified intent; and transmitting, by the computing system, the response as output.

7. The non-transitory computer readable medium of claim 6 wherein the intent model is a multi-key map of features to words.

8. The non-transitory computer readable medium of claim 6 wherein the score is determined based on weights assigned to each of the respective features in the intent model.

9. The non-transitory computer readable medium of claim 6, wherein the features correspond to parts of speech and the relations correspond to parts of speech defining relationships between words.

10. A method for training one or more intent models comprising:

receiving, by a computer system, a set of training utterances, each training utterance being labeled with a particular intent; and for each training utterance:

extracting, by the computer system from the training utterance, one or more features, wherein at least one of the features is a semantically relevant grammatical relation, and wherein each feature has a value represented by one or more words included in the training utterance, such that each feature corresponds to a part of speech of the value represented by the respective one or more words;

storing, by the computer system, the one or more features along with their corresponding values in association with the intent with which the training utterance is labeled; and storing, by the computer system, one or more weights for each of the one or more features to the one or more intent models, wherein the weights are assigned to the features based on a relevance of each feature to the intent, wherein the one or more intent models are useable for determining an intent for an utterance in a chatbot system.

11. The method of claim 10, wherein the features and the values are stored as a multi-key model for the corresponding intent.

* * * * *

UNITED STATES PATENT AND TRADEMARK OFFICE
CERTIFICATE OF CORRECTION

PATENT NO. : 11,538,468 B2
APPLICATION NO. : 17/016203
DATED : December 27, 2022
INVENTOR(S) : Saba Amsalu Teserra It is certified that error appears in the above-identified patent and that said Letters Patent is hereby corrected as shown below:

In the Specification

In Column 3, Line 47, after "a" delete "the", therefor.

In Column 11, Line 65, delete "(Temperature)" and insert -- (Temperature)" --, therefor.

In Column 12, Line 34, delete "money."" and insert -- money. --, therefor.

In Column 15, Line 48, before "For" insert -- . --, therefor.

In Column 15, Line 57, before "Such" insert -- . --, therefor.

In Column 20, Line 51, delete "infra-red" and insert -- infrared --, therefor.

In Column 27, Line 4, delete "Google)" and insert -- Google --, therefor.

In the Claims

In Column 32, Line 13, in Claim 7, delete "6" and insert -- 6, --, therefor.

In Column 32, Line 16, in Claim 8, delete "6" and insert -- 6, --, therefor.

Signed and Sealed this
Tenth Day of October, 2023

*Katherine Kelly Vidal*
*Director of the United States Patent and Trademark Office*